United States Patent
Zellner et al.

(10) Patent No.: US 8,069,089 B2
(45) Date of Patent: *Nov. 29, 2011

(54) METHODS, SYSTEMS, AND PRODUCTS FOR CONDUCTING ELECTRONIC COMMERCE

(75) Inventors: Samuel N. Zellner, Dunwoody, GA (US); Douglas R. O'Neil, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 16 days.

This patent is subject to a terminal disclaimer.

(21) Appl. No.: 12/500,645

(22) Filed: Jul. 10, 2009

(65) Prior Publication Data

US 2009/0276293 A1 Nov. 5, 2009

Related U.S. Application Data

(63) Continuation of application No. 11/029,563, filed on Jan. 5, 2005, now Pat. No. 7,577,590.

(51) Int. Cl.
*G06Q 30/00* (2006.01)

(52) U.S. Cl. ............... 705/26.2; 705/26.1; 705/27.1

(58) Field of Classification Search ............ 705/26, 705/27, 26.1–27.2
See application file for complete search history.

(56) References Cited

U.S. PATENT DOCUMENTS

| | | | |
|---|---|---|---|
| 6,556,975 B1 * | 4/2003 | Wittsche | 705/26 |
| 2004/0186783 A1 * | 9/2004 | Knight et al. | 705/16 |
| 2006/0047569 A1 * | 3/2006 | Sulaiman | 705/14 |

OTHER PUBLICATIONS

"Comercis Launches Business-to-Business E-commerce and Web Services, Vertical INternet Communities; Company Builds Internet Communities in Commerce." Business Editors. Business Wire. New York: Jul. 12, 1999, p. 1. Retrieved via ProQuest.*

* cited by examiner

*Primary Examiner* — Michael A. Misiaszek
(74) *Attorney, Agent, or Firm* — Scott P. Zimmerman PLLC

(57) ABSTRACT

Methods, systems, and computer program products are disclosed for conducting electronic commerce. A merchant participates in an online community of merchants. Sales information is shared with the online community such that each merchant is informed of each sale of each merchant participating in the online community.

20 Claims, 4 Drawing Sheets

METHODS, SYSTEMS, AND PRODUCTS FOR CONDUCTING ELECTRONIC COMMERCE

CROSS-REFERENCE TO RELATED APPLICATIONS

This application is a continuation of U.S. application Ser. No. 11/029,563, filed Jan. 5, 2005, now issued as U.S. Pat. No. 7,577,590, and incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to data processing. This application, more particularly, relates to financial and database management and accessing and to electronic shopping.

Electronic, online shopping malls are known in the art. These online shopping malls provide access to multiple merchants offering goods and services. An online shopping mall benefits both the shopping customer and the merchant. When the customer shops the online shopping mall, the customer can conveniently access multiple merchants, usually from a single website, portal, or uniform resource locator. The customer need not individually search for each merchant. The merchant, too, benefits by aligning the business with other merchants who might have greater name recognition. The merchant also benefits from cross-linking the websites of the mall merchants.

A problem with the conventional electronic on-line shopping systems is that they fail to comprehend the deflationary potential of an organized group of merchants. The online merchants still conduct their online presence and business using conventional tactics and strategies, without taking into account the sales/inventory data of other merchants. What is needed is a new strategy that drives prices to their lowest point and, yet, allows each merchant to specialize and to thrive.

SUMMARY

The aforementioned problems, and other problems, are reduced, according to the exemplary embodiments, using an ecosystem of merchants. When a merchant participates in this ecosystem, the merchants share business information amongst all the members of the community. All the merchants are interrelated, in that each merchant shares sales information (such as a sales price and a sale quantity) with the entire community. Each merchant is informed of each sale of every merchant participating in the community. Each merchant, then, knows every other merchant's sales, pricing, and inventory of every other merchant. Because each merchant knows the sales, pricing, and inventory of every other merchant, the merchants collectively resemble an ecosystem in which all the participants are interrelated. As this patent will explain, this strategy of sharing business information will benefit both the customer and the merchants. Prices will be driven to their lowest value, and the participating merchants will specialize and thrive.

Because all the merchants share business information, business management functions are provided for each participating merchant. The sharing of business information allows each merchant to understand the commercial activity of the entire ecosystem. When a customer purchases from the community of merchants, the customer's purchasing behavior is tracked and provided to the merchants. If, for example, the customer shops the community via an online presence (such as a website providing access to the participating merchants), the customer's online browsing habits and "clicks" are tracked and provided to all the merchants. When the customer requests an online search for a product or service, and when that customer eventually makes a purchase, are examples of information provided to each merchant. By analyzing sales and inventory, a product or service that is selling can be ascertained at any certain period of time. Each merchant, or a particular merchant, can be informed of the products/services that are selling within the community.

According to exemplary embodiments, suggestions may be made to the merchants. Software implementations of these concepts, for example, may make suggestions based on category sales. When a particular category of items is selling very well at a particular moment in time, these concepts may provide merchants with that category and an average selling price in the marketplace. The concepts may even suggest what a merchant should promote to capitalize on the category sales trend. If the merchant has inventory that matches or compliments the briskly-selling category, those items may be promoted.

According to exemplary embodiments, price elasticity information may be provided. Because the customer's browsing behavior and purchasing behavior is tracked, the products or services that receive customer inquiries can be ascertained. Also, the merchants that have excess inventory can be ascertained. With the knowledge of what is purchased at what price points, price elasticity curves may be generated. This price elasticity information is provided to merchants having excess inventory of that product. The merchant, knowing this price elasticity information, can make an informed decision as to how to best to promote the business and at what price point moves product. The price elasticity information provides more than a range of pricing, but the price elasticity information includes a statistical distribution and a median price. Each merchant, then, knows the entire size of the ecosystem and the merchant can immediately decide to compete.

According to exemplary embodiments, real-time market information is provided. The ecosystem provides each merchant with real time market statistics and quantitative market behavior. As discussed herein, the entire community of merchants may be observed, and management and information services may be provided to each merchant. The ecosystem receives and analyzes all the business information generated by the entire community of merchants. The ecosystem observes every transaction within the community and relates those transactions to market data. This market data is based on actual transactions and quantitative research on a product-by-product basis across the entire ecosystem. This information is fed back to each individual merchant participating in the community. The ecosystem, for example, may notice that a merchant's website receives many "clicks" or "hits," but the merchant does not have corresponding sales. The ecosystem might then suggest, or even automatically implement, a price reduction to spur sales. If the price reduction is still ineffective, the ecosystem might determine that the merchant's current advertising or promotion is ineffective. The ecosystem can notify the merchant and make an alternate suggestion.

The ecosystem, however, also benefits the customer. As soon as the customer enters the community (such as by accessing the community via a single website portal), the ecosystem informs the customer of each merchant's specials. As soon as a merchant posts or runs a special price for a product or service, the ecosystem may immediately inform the customer. The ecosystem may also inform the customer of another merchant's related products, comparative or complimentary products, substitute products, or even competing products. The ecosystem, then provides the customer a natural, and participatory, deflationary environment.

According to the exemplary embodiments, methods, systems, and computer program products are disclosed for participating in an online ecosystem. This online ecosystem represents an interrelated community of merchants. This interrelation means that each merchant shares business information with the entire community. That is, each merchant shares sales information (such as a sales price and a sale quantity) with the online community. Each merchant is informed of each sale of every merchant participating in the community. Each merchant, then, knows every other merchant's sales, pricing, and inventory of every other merchant. Each merchant, then, knows the commercial activity of the entire ecosystem.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DESCRIPTION OF THE DRAWINGS

These and other features, aspects, and advantages of the embodiments of the present invention are better understood when the following Detailed Description is read with reference to the accompanying drawings, wherein.

DETAILED DESCRIPTION

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Those of ordinary skill in the art understand that the exemplary hardware, software, processes, methods, and/or operating systems described herein are for illustrative purposes and, thus, are not intended to be limited to any particular named manufacturer.

The exemplary embodiments describe methods, systems, and products for providing an ecosystem of merchants. When a merchant participates in this ecosystem, the merchants share business information amongst all the members of the community. All the merchants are interrelated, in that each merchant shares sales information (such as a sales price and a sale quantity) with the entire community. Each merchant is informed of each sale of every merchant participating in the community. Each merchant, then, knows every other merchant's sales, pricing, and inventory of every other merchant. Because each merchant knows the sales, pricing, and inventory of every other merchant, the merchants collectively resemble an ecosystem in which all the participants are interrelated.

Figure 1:
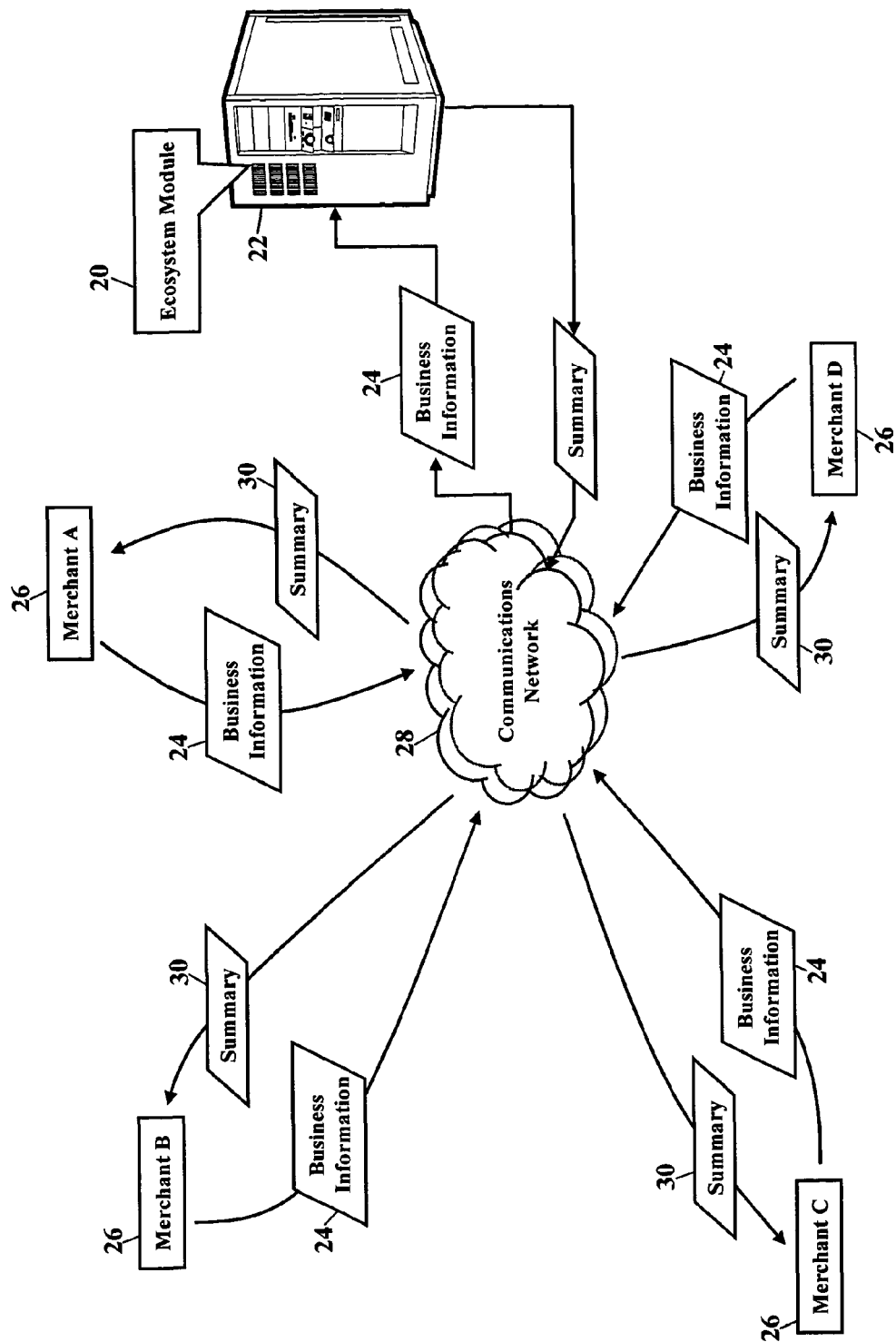
FIG. 1 is a schematic illustrating an exemplary operating environment in which the invention may be implemented according to exemplary embodiments.

FIG. 1 is a schematic illustrating an operating environment in which the invention may be implemented according to exemplary embodiments. An ecosystem module 20 comprises methods, systems, computer programs, and/or computer program products that provide services to an online, interrelated community of merchants. The ecosystem module 20 operates within any computer system, such as a computer server 22. The ecosystem module 20 receives and stores business information 24 from multiple merchants 26. The business information 24 is typically communicated via a communications network 28. The communications network 28 may be a distributed computing network, such as the Internet (sometimes alternatively known as the "World Wide Web"), an intranet, a local-area network (LAN), and/or a wide-area network (WAN). The communications network 28 may alternatively or additionally include a cable network operating in the radio-frequency domain and/or the Internet Protocol (IP) domain. The communications network 28, however, may also include portions of the Public Switched Telephone Network (PSTN). The communications network 28 may include coaxial cables, copper wires, fiber optic lines, and/or hybrid-coaxial lines. The communications network 28 may even include wireless portions utilizing any portion of the electromagnetic spectrum and any signaling standard (such as the various cellular standards CDMA, TDMA, GSM, and/or the I.E.E.E. 802 family of standards).

The ecosystem module 20 obtains and stores business information 24. The ecosystem module 20 resembles a central repository for each merchant's business information. The business information 24 may be any information that is generated in the course of business. The business information 24, for example, includes each merchant's sales, pricing, and inventory records. The ecosystem module 20 stores and/or manages each sale for each merchant 26. The ecosystem module 20 may also store and/or manage each merchant's inventory records, payroll records, health care and other benefits records, accounts receipts/receivables, banking records, returns records, non-completed sales transactions, sales with special promotions/discounts, sales with credit cards/debit cards/checks/cash, and any other information generated during the course of each merchant's business. The ecosystem module 20 stores and/or manages all these records on behalf of each merchant 26.

The ecosystem module 20, however, also provides some or all of this business information 24 to the entire community of merchants. The ecosystem module 20 return communicates some or all of this business information 24 to every other merchant participating in the community. Most likely the ecosystem module 20 periodically communicates a summary 30 to each participating merchant 26. This summary 30 informs each merchant 26 of the sales, pricing, and inventory of every other merchant participating in the community. The ecosystem module 20 thus informs each merchant 26 of the commercial activity of the entire community. Because each merchant 26 knows the sales, pricing, and inventory of every other merchant, the merchants resemble an ecosystem in which all the participants are interrelated.

This ecosystem will, in time, force prices to their lowest competitive level at which each participating merchant best competes. Because the each merchant's business information is shared amongst the other participants, each participant is competitively forced to offer the best product/service for the lowest price. If any merchant enjoys an attractive margin of profit, other participating merchants will quickly compete. This ecosystem, then, will force each participating merchant to offer the lowest price at which other merchants decline to compete. Because each merchant is competitively forced to the lowest price, in time, each participating merchant will specialize in a good or service, at the lowest price, at which no other participating merchant wishes to compete. Once the competition is eliminated, the merchant may even be able to raise prices to improve margins. Should the merchant's margins become too large, and thus attractive, the merchant will invite competition from another participating merchant. Each merchant, then, will eventually specialize in a product or service at a price at which no other participant wishes to compete.

Figure 2:
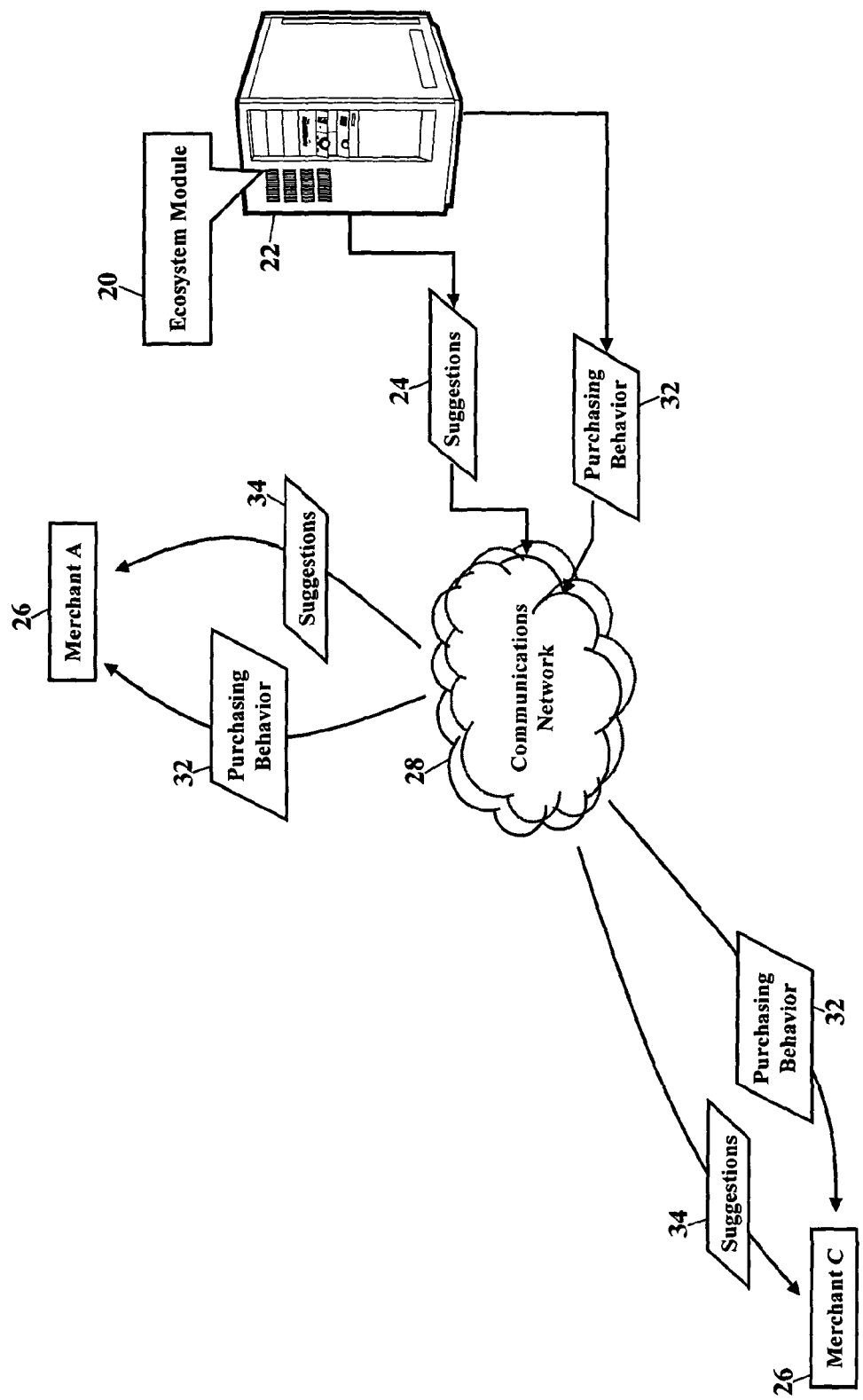
FIG. 2 is a schematic further illustrating an exemplary operating environment in which the invention may be implemented according to exemplary embodiments.

FIG. 2 is a schematic further illustrating the exemplary embodiments. FIG. 2 illustrates that the ecosystem module 20 may also provide trends, recommendations, and patterns to each merchant. Because the ecosystem module 20 receives and stores the business information (shown as reference numeral 24 in FIG. 1) of each merchant 26, the ecosystem module 20 may also analyze each merchant's business information. The ecosystem module 20 may also analyze the commercial activity of the entire community. Knowing each merchant's business information, and that of the entire community, the ecosystem module 20 can analyze and compare the merchant to the entire community. The ecosystem module 20, for example, could provide each merchant 26 a purchasing behavior 32 of a customer accessing the community of merchants. The ecosystem module 20 could provide individualized suggestions 34 to each merchant. These suggestions 34 would help the merchant select merchandise, lower costs, and/or move product. The ecosystem module 20 could suggest the merchant promote a good or service based on a sales trend within the online community. The ecosystem module 20 could also suggest pricing information to reduce excess inventory.

The ecosystem module 20 provides business management functions for each merchant 26. The ecosystem module 20 allows each merchant to understand the commercial activity of the entire ecosystem. The ecosystem module 20 may permit a customer that shops within the community to see/view the inventory of all the participating merchants. The ecosystem module 20 tracks the customer's browsing behavior and purchasing behavior. The ecosystem module 20 knows what customer is searching for what product or service and which customers eventually purchase. By analyzing sales and inventory, the ecosystem module 20 also knows what product or service is selling at any certain period of time. The ecosystem module 20 may then inform each merchant, or a particular merchant, of the products/services that are selling within the community. The ecosystem module 20 may even analyze customer returns and develop a return behavior that is likewise shared.

The ecosystem module 20, for example, may make suggestions based on category sales. Suppose, for example, that a particular category of items is selling very well at a particular moment in time. The ecosystem module 20 could provide merchants with that category and an average selling price in the marketplace. The ecosystem module 20 may then suggest what a merchant 26 should promote to capitalize on the category sales trend. If automobiles, for example, are briskly selling, the ecosystem module 20 might suggest a particular merchant promote automotive-related items (e.g., cleaners, waxes, additives, performance products, and other automotive-related accessories). If the merchant has inventory that matches or compliments the briskly-selling category, the ecosystem module 20 may suggest promoting those items.

The ecosystem module 20 may provide price elasticity information. The ecosystem module 20, as mentioned above, tracks the customer's browsing behavior and purchasing behavior. The ecosystem module 20 knows what products or services receive customer inquiries. The ecosystem module 20 also knows what merchants have excess inventory. Because the ecosystem module knows what is purchased and at what price points, the ecosystem module 20 may generate price elasticity curves. This price elasticity information is provided to merchants having excess inventory of that product. The merchant, knowing this price elasticity information, can make an informed decision as to how to best to promote the business and at what price point moves product. The price elasticity information provides more than a range of pricing, but the price elasticity information includes a statistical distribution and a median price. An elasticity curve relates to an optimum price point. The ecosystem module 20, then, informs each merchant of the entire size of the ecosystem and the merchant can immediately decide to compete.

The ecosystem module 20 may provide all manner of data to the community. The ecosystem module 20, for example, may provide pricing distributions (such as a Gaussian or "bell" curve) for the entire market. These pricing distributions may even be provided for geographic segments of the market or groupings of merchants. The ecosystem module 20 may provide statistics regarding the effectiveness of a merchant's advertising, a group of merchants advertising, or the community's advertising. The ecosystem module 20 may analyze purchases by product, by geography, and/or by demographics (such as household income). The ecosystem module 20 may also analyze and determine a ratio of inquiries to purchases by product and/or by customer demographics. A user interface for the merchant supplies summaries and/or reports and provides the ability to select products by merchant codes and SIC codes and other category codes.

According to an exemplary embodiment, the ecosystem module 20 provides real-time market information. The ecosystem module 20 provides each merchant with real time market statistics and quantitative market behavior. The ecosystem module 20 observes the entire community of merchants and provides management and information services to each merchant. The ecosystem module 20 has the benefit of receiving and analyzing all the business information 24 of the entire community of merchants. The ecosystem module 20 observes every transaction within the community and relates those transactions to market data. This market data is based on actual transactions and quantitative research on a product-byproduct basis across the entire ecosystem. This information is fed back to each individual merchant participating in the community. The ecosystem module 20, for example, may notice that a merchant's website receives many "clicks" or "hits," but the merchant does not have corresponding sales. The ecosystem module 20 might then suggest, or even automatically implement, a price reduction to spur sales. If the price reduction is still ineffective, the ecosystem module might determine that the merchant's current advertising or promotion is ineffective. The ecosystem module 20 notifies the merchant and makes an alternate suggestion. The ecosystem module 20 may provide an advertising behavior for the entire market community.

The ecosystem module 20, however, also benefits the customer. As soon as the customer enters the community (such as by accessing the community via a single website portal), the ecosystem module 20 informs the customer of each merchant's specials. As soon as a merchant posts or runs a special price for a product or service, the ecosystem module 20 may immediately inform the customer. The ecosystem module 20 may also inform the customer of another merchant's related products, comparative or complimentary products, substitute products, or even competing products. The ecosystem module 20 may even provide a qualitative factor for alternative products, thus allowing the customer to select trusted or perceived brands (such as the perceived quality of a trusted brand of product verses a generic brand). The ecosystem module 20, then provides the customer a natural, and participatory, deflationary environment.

The ecosystem module 20 can even track distribution channels. The community of merchants may be accessible via a website, and preferably a single website portal. This website portal provides access to all the merchants participating in the community. Some merchants, however, may also have a bricks and mortar store. That physical store can be linked to the ecosystem module 20. That is, the ecosystem module 20 receives the business information 24 from online sources and from retail stores. The ecosystem module 20 provides sales, pricing, and inventory management systems for both the merchant's online presence and the merchant's bricks and mortar location. If a customer purchases from the physical location, the ecosystem module 20 observes that purchase. The ecosystem module 20, then, observes not only the sale but also that sale's distribution method.

The ecosystem module 20 may be offered by a service provider. This service provider receives business information from a community of merchants. This business information may include each merchant's sales, the price for each sale, and the merchant's inventory. The service provider then shares this business information with the community. Each participating merchant is thus informed of every other participating merchant's sales. Each participating merchant is informed of a sales price for each sale of every merchant participating in the community. Each participating merchant may also be informed of an inventory of every merchant participating in the community. The service provider may analyze the commercial activity of the entire community and provide summaries to each merchant. The service provider may analyze each merchant's sales, pricing, and inventory to provide any of the information discussed in relation to the ecosystem module 20. Each merchant may report their sales, pricing, and inventory on a per-transaction basis, on an hourly basis, on a daily or monthly basis, or at any other interval of time. The service provider may query each participating merchant for the merchant's business information 24. The service provider offers feedback on what is going on in the overall community. The service provider offers feedback on the merchant's advertising and the customer's browsing, clicking, and purchasing behavior. The service provider bills for this feedback service.

The ecosystem module 20, and/or the service provider, may also provide a business management system for the participating merchants. The ecosystem module 20 may comprise one or more software products that provide solutions for inventory management, pricing, billing, and advertising. These software products can be offered to the participating merchant, thus allowing the service provider to store and manage all the merchant's business records.

Figure 3:
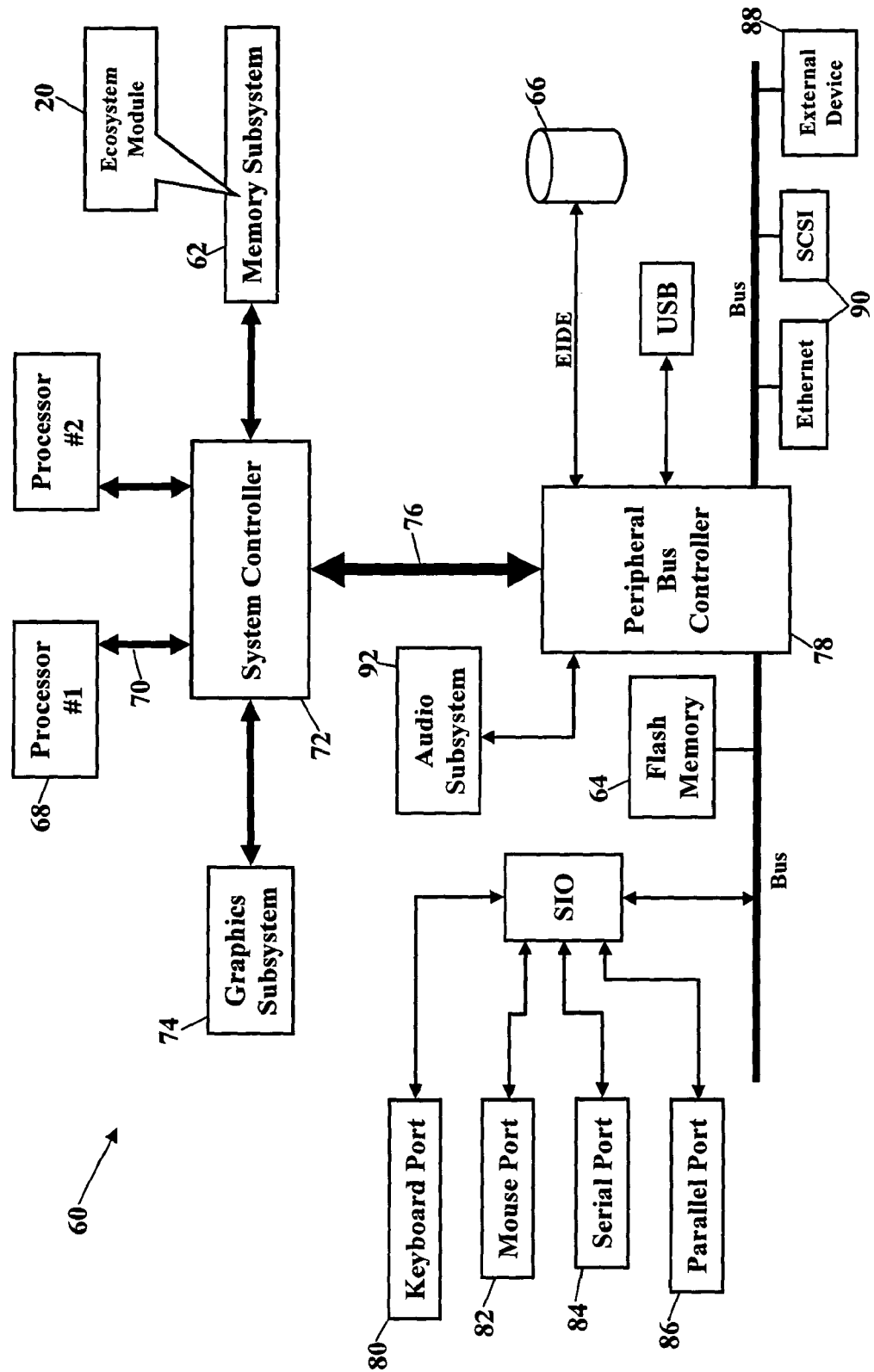
FIG. 3 depicts another possible operating environment according to exemplary embodiments.

FIG. 3 depicts another possible operating environment for the exemplary embodiments. FIG. 3 is a block diagram showing the ecosystem module 20 residing in a computer system 60. The computer system 60 may be any computing system, such as the computer server (shown as reference numeral 22 in FIGS. 1 & 2), an IP network element such as an IP router/switch/hub/gateway/proxy, or any other computer device. As FIG. 3 shows, the ecosystem module 20 operates within a system memory device. The ecosystem module 20, for example, is shown residing in a memory subsystem 62. The ecosystem module 20, however, could also reside in flash memory 64 or a peripheral storage device 66, or in firmware or hardware, or in any combination. The computer system 60 also has one or more central processors 68 executing an operating system. The operating system, as is well known, has a set of instructions that control the internal functions of the computer system 60. A system bus 70 communicates signals, such as data signals, control signals, and address signals, between the central processor 68 and a system controller 72 (typically called a "Northbridge"). The system controller 72 provides a bridging function between the one or more central processors 68, a graphics subsystem 74, the memory subsystem 62, and a PCI (Peripheral Controller Interface) bus 76. The PCI bus 76 is controlled by a Peripheral Bus Controller 78. The Peripheral Bus Controller 78 (typically called a "Southbridge") is an integrated circuit that serves as an input/output hub for various peripheral ports. These peripheral ports are shown including a keyboard port 80, a mouse port 82, a serial port 84 and/or a parallel port 86 for a video display unit, one or more external device ports 88, and networking ports 90 (such as SCSI or Ethernet). The Peripheral Bus Controller 78 also includes an audio subsystem 92. Those of ordinary skill in the art understand that the program, processes, methods, and systems described in this patent are not limited to any particular computer system or computer hardware.

Those of ordinary skill in the art also understand the central processor 68 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

An operating system that may be used, according to an exemplary embodiment, is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com). and Mac® OS (Mac® is a registered trademark of Apple Computer, Inc., 1 Infinite Loop, Cupertino, Calif. 95014, 408.996.1010, www.apple.com). Example operating systems of IP network elements including IP routers/switches/hubs/gateways/proxies include Cisco IOS (Internet Operating System), Vxworks, various proprietary operating systems, and variations of UNIX. Those of ordinary skill in the art again understand that the program, processes, methods, and systems described herein are not limited to any particular operating system.

The system memory device (shown as memory subsystem 62, flash memory 64, or peripheral storage device 66) may also contain an application program. The application program cooperates with the operating system and with a video display unit (via the serial port 84 and/or the parallel port 86) to provide a Graphical User Interface (GUI). The Graphical User Interface typically includes a combination of signals communicated along the keyboard port 80 and the mouse port 82. The Graphical User Interface provides a convenient visual and/or audible interface with a user of the computer system 60.

The ecosystem module may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the claims, allow the ecosystem module to be easily disseminated. A computer program product for participating in an online ecosystem comprises a computer readable medium including computer-readable instructions. These instructions participate in a sale of a good or service in an online community of merchants. Each merchant sells the good or service via a single web portal providing access to the online community of merchants. The instructions share sales information with the online community such that each merchant is informed of each sale of every merchant participating in the community.

Figure 4:
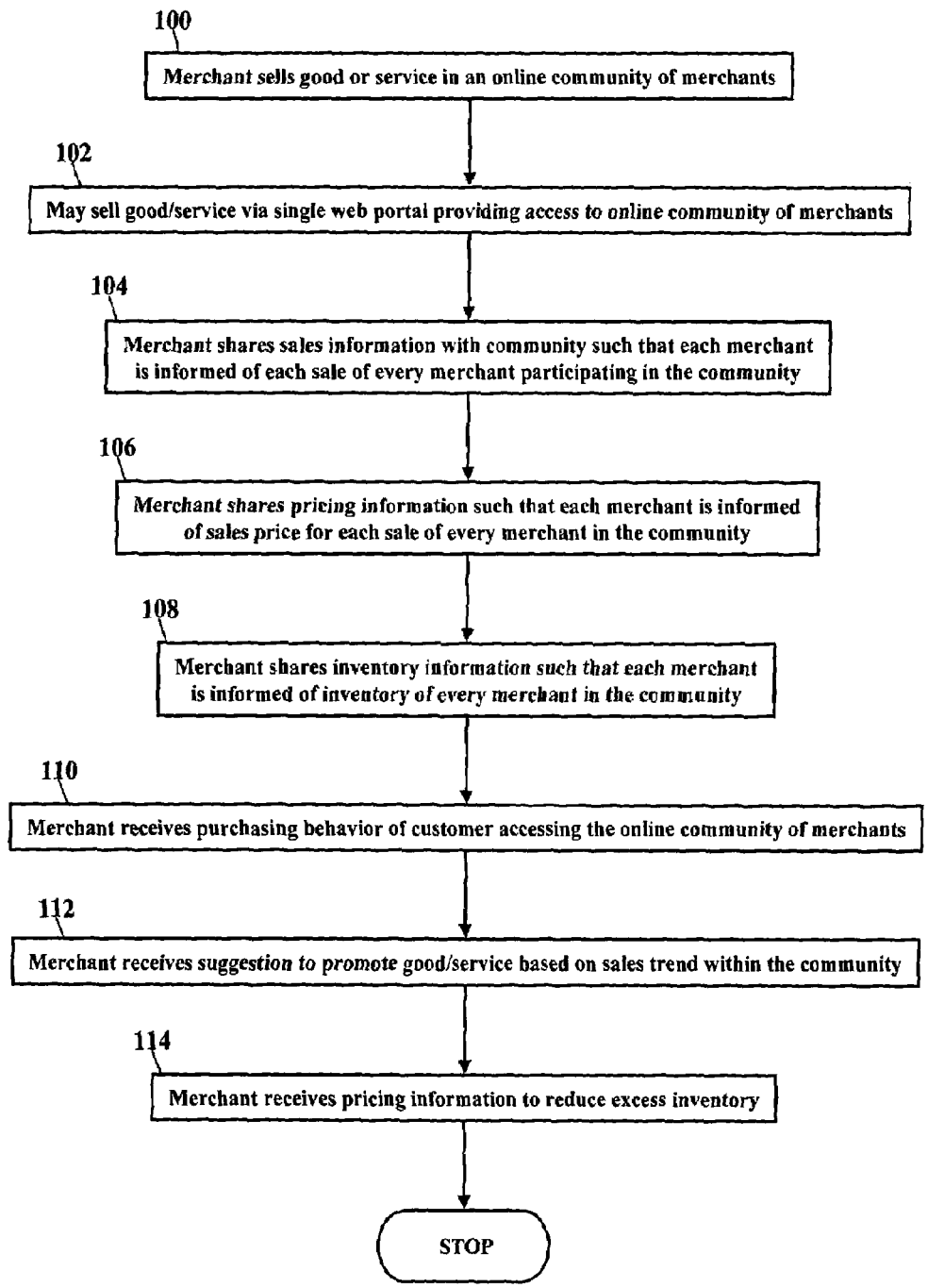
FIG. 4 is a flowchart illustrating an exemplary method of participating in an online ecosystem.

FIG. 4 is a flowchart illustrating an exemplary method of participating in an online ecosystem. A merchant sells a good or service in an online community of merchants (Block 100). The merchant may sell the good or service via a single web portal providing access to the online community of merchants (Block 102). The merchant shares sales information with the online community such that each merchant is informed of each sale of every merchant participating in the community (Block 104). The merchant may also share pricing information such that each merchant is informed of a sales price for each sale of every merchant participating in the community (Block 106). The merchant may also share inventory information such that each merchant is informed of an inventory of every merchant participating in the community (Block 108). The merchant receives a purchasing behavior of a customer accessing the online community of merchants (Block 110). The merchant receives a suggestion to promote a good or service based on a sales trend within the online community (Block 112). The merchant may also receive pricing information to reduce excess inventory (Block 114).

While exemplary embodiments of the present invention have been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method of conducting electronic commerce, comprising:
   performing, by a processor executing code stored in memory, the following:
   participating in an online community of merchants;
   providing a category of an item and an average selling price of the item within the category to each merchant participating in the online community of merchants; and
   suggesting a participating merchant promote a related item in the category when the participating merchant has inventory that matches the category of the item that is selling,
   wherein each merchant in the online community is informed of each sale of every other merchant participating in the online community.

2. The method according to claim 1, further comprising sharing pricing information with the online community such that each merchant is informed of a sales price for the every other merchant participating in the online community.

3. The method according to claim 1, further comprising sharing inventory information with the online community such that each merchant is informed of the inventory of the every other merchant participating in the online community.

4. The method according to claim 1, further comprising sharing pricing information and inventory information with the online community such that each merchant is informed of a sales price for each sale of the every other merchant and each merchant is informed of the inventory of the every other merchant.

5. The method according to claim 1, further comprising selling from a single web portal providing access to the online community of merchants.

6. The method according to claim 1, further comprising receiving a promotional suggestion based on a sales trend within the online community.

7. The method according to claim 1, further comprising receiving pricing information to reduce excess inventory.

8. A system, comprising:
   a processor executing code stored in memory that causes the processor to:
   store a single, website portal to an online community of merchants;
   share sales information with the online community such that each merchant is informed of each sale of every other merchant who participates in the online community;
   provide a category of an item and an average selling price of the item within the category to each merchant participating in the online community;

suggest participating merchant promote a related item in the category when participating merchant has inventory that matches the category of the item that is selling; and share inventory information with the online community such that each merchant is informed of an inventory of every other merchant who participates in the online community.

9. The system according to claim 8, wherein when a customer enters the online community and requests a search, the code further causes the processor to share the search with the online community such that each merchant is informed of the search.

10. The system according to claim 9, wherein the code further causes the processor to share a result of the search with the online community such that each merchant is informed of the result.

11. The system according to claim 8, wherein when a customer enters the online community and purchases, the code further causes the processor to share a purchase price with the online community such that each merchant is informed of the purchase price.

12. The system according to claim 8, wherein the code further causes the processor to share online browsing habits with each merchant within the online community.

13. The system according to claim 8, wherein the code further causes the processor to suggest a price to the participating merchant.

14. The system according to claim 8, wherein the code further causes the processor to generate a price elasticity.

15. The system according to claim 8, wherein the code further causes the processor to periodically communicate a summary to each merchant that summarizes sales, pricing, and inventory of the every other merchant.

16. The system according to claim 8, wherein the code further causes the processor to generate a suggestion based on a sales trend within the online community.

17. The system according to claim 8, wherein when a customer enters the online community, the code further causes the processor to track the customer's online browsing clicks and provide the online browsing clicks to each merchant.

18. A computer readable medium storing processor executable instructions for performing a method, the method comprising:

storing a single, website portal to an online community of merchants;

sharing sales information with the online community such that each merchant is informed of each sale of every other merchant who participates in the online community;

providing a category of an item and an average selling price of the item within the category to each merchant participating in the online community;

suggesting participating merchant promote items related to the category when participating merchant has inventory that matches the category of the item that is selling; and sharing inventory information with the online community such that each merchant is informed of an inventory of every other merchant who participates in the online community.

19. The computer readable medium according to claim 18, further comprising instructions for when a customer enters the online community and requests a search, then sharing the search with the online community such that each merchant is informed of the search.

20. The computer readable medium according to claim 19, further comprising instructions for sharing a result of the search with the online community such that each merchant is informed of the result.

* * * * *